United States Patent
Amer

(10) Patent No.: US 12,426,993 B2
(45) Date of Patent: Sep. 30, 2025

(54) ORTHODONTIC ALIGNER WITH BUILT-IN HOOK OR TRACTION DEVICE

(71) Applicant: American Aligners Inc., San Jose, CA (US)

(72) Inventor: Hesham Amer, San Jose, CA (US)

(73) Assignee: American Aligners Inc., San Jose, CA (US)

( * ) Notice: Subject to any disclaimer, the term of this patent is extended or adjusted under 35 U.S.C. 154(b) by 179 days.

(21) Appl. No.: 17/981,095

(22) Filed: Nov. 4, 2022

(65) Prior Publication Data

US 2023/0135385 A1     May 4, 2023

Related U.S. Application Data

(60) Provisional application No. 63/275,797, filed on Nov. 4, 2021.

(51) Int. Cl.
| | |
|---|---|
| *A61C 7/08* | (2006.01) |
| *A61C 7/00* | (2006.01) |
| *A61C 7/30* | (2006.01) |
| *A61C 7/36* | (2006.01) |

(52) U.S. Cl.
CPC ............... *A61C 7/002* (2013.01); *A61C 7/08* (2013.01); *A61C 7/303* (2013.01); *A61C 7/36* (2013.01)

(58) Field of Classification Search
CPC .............. A61C 7/08; A61C 7/002; A61C 7/00
See application file for complete search history.

(56) References Cited

U.S. PATENT DOCUMENTS

| | | | |
|---|---|---|---|
| 10,959,810 B2 | 3/2021 | Li et al. | |
| 2002/0192617 A1* | 12/2002 | Phan | A61C 19/003 433/18 |
| 2006/0188834 A1* | 8/2006 | Hilliard | A61C 7/08 433/24 |
| 2011/0269092 A1* | 11/2011 | Kuo | B33Y 50/02 433/215 |
| 2013/0122448 A1* | 5/2013 | Kitching | A61C 7/08 433/24 |
| 2016/0199152 A1 | 7/2016 | Kim | |
| 2018/0325626 A1 | 11/2018 | Huang | |
| 2020/0188061 A1* | 6/2020 | Carriere Lluch | A61C 7/36 |
| 2020/0337806 A1 | 10/2020 | Kopelman | |
| 2023/0135385 A1* | 5/2023 | Amer | A61C 7/36 433/213 |

FOREIGN PATENT DOCUMENTS

WO     2018201220 A1     11/2018

* cited by examiner

*Primary Examiner* — Ralph A Lewis
(74) *Attorney, Agent, or Firm* — Outlier Patent Attorneys, PLLC

(57) ABSTRACT

An orthodontic aligner includes an aligner body configured for receiving upper teeth or lower teeth. The aligner body has a facial surface, a lingual surface, a gingival edge, and an incisal edge. A hook is integrally formed on either the facial surface or the lingual surface of the aligner body. The hook is configured so that an elastic band can be removably attached thereto. The hook is positioned between the gingival edge and the incisal edge of the aligner body. The hook protrudes at an angle relative to the surface of the aligner body. The angle may be between 20 and 60 degrees. The aligner body and the hook are formed simultaneously during manufacturing.

4 Claims, 9 Drawing Sheets

ORTHODONTIC ALIGNER WITH BUILT-IN HOOK OR TRACTION DEVICE

CROSS-REFERENCE TO RELATED APPLICATIONS

This Application claims priority to U.S. Provisional Patent Application No. 63/275,797 filed on Nov. 4, 2021, entitled "Orthodontic Aligner with Built-In Hook or Traction Device," the contents of which are hereby incorporated herein by reference.

BACKGROUND

Field of the Art

This disclosure relates to removable orthodontic aligners that include additional built-in traction devices. For example, a removable orthodontic aligner in accordance with the present invention includes built-in hooks that are integrally formed simultaneously with the rest of the aligner.

Discussion of the State of the Art

Removable orthodontic aligners are gaining in popularity due to the convenience of these aligners. The aligners are typically clear and thus are more aesthetically pleasing than conventional metal braces. Further, the aligners can be removed from the patient's teeth for eating, drinking, brushing, flossing, etc.

One problem with removable aligners is that the corrective force provided by the aligners is less than that of conventional metal hardware, such as braces. As such, orthodontic treatment may be prolonged using the aligners. In some cases, the tooth arrangement is too irregular, and aligners are not an option because they do not provide enough corrective force.

SUMMARY

An orthodontic aligner in accordance with the present invention includes a built-in hook for use with elastic bands. In this manner, the present aligner provides more corrective force than a conventional aligner. Because the aligner body and the built-in hooks are made simultaneously, the aligner is easier to manufacture than an aligner to which hooks are later applied.

Using interactive software, an orthodontic practitioner is able to select a location for a built-in hook before the aligner is made. Then, the aligner, or a series of aligners, is fabricated with the hook built in. As such, the hook location is accurate and reproducible.

In one example, the orthodontic aligner in accordance with the present invention includes an aligner body configured for receiving upper teeth or lower teeth. The aligner body has a facial surface, a lingual surface, a gingival edge, and an incisal edge. The orthodontic aligner further includes a hook integrally formed on the facial surface or the lingual surface of the aligner body. The hook is configured for removably attaching an elastic band thereto. The hook is positioned between the gingival edge and the incisal edge of the aligner body. The hook may protrude at an angle relative to the facial surface or the lingual surface of the aligner body. The angle may be less than 60 degrees and may be greater than 20 degrees. A distance between the hook and the gingival edge of the aligner body may be at least 1 mm. The hook and the aligner body may be formed simultaneously.

In another example, a method of making an orthodontic aligner in accordance with the present invention includes uploading a scan of a patient's teeth to an interactive software program to create a virtual model of the patient's teeth; selecting a position for an aligner hook on the virtual model of the patient's teeth using the interactive software; creating a physical 3D model of the patient's teeth corresponding to the virtual model, wherein the 3D model includes a protrusion corresponding to the selected position for the aligner hook; and thermoforming a plastic sheet over the 3D model, thereby creating an orthodontic aligner having a built in aligner hook. Selecting the position for the aligner hook may include selecting a location and an angle of the aligner hook relative to the patient's teeth.

In yet another example, a method of making an orthodontic aligner in accordance with the present invention includes uploading a scan of a patient's teeth to an interactive software program to create a virtual model of the patient's teeth; selecting a position for an aligner hook on the virtual model of the patient's teeth using the interactive software; and 3D printing the orthodontic aligner based on the virtual model, wherein the 3D printed orthodontic aligner comprises a built in aligner hook in the selected position. Selecting the position for the aligner hook may include selecting a location and an angle of the aligner hook relative to the patient's teeth.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1A:
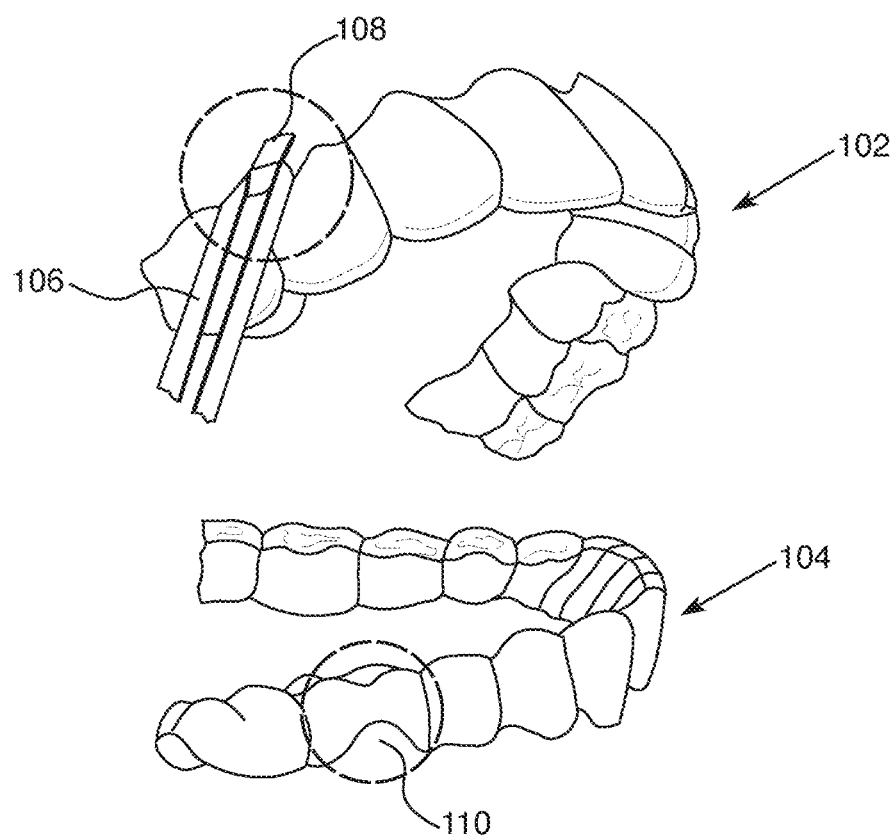
FIGS. 1A and 1B illustrate a conventional approach for adding elastic bands to orthodontic aligners.

An orthodontic aligner in accordance with the present invention includes an aligner body and a built-in hook. The aligner body is configured for receiving upper teeth or lower teeth and includes a facial surface, a lingual surface, a gingival edge, and an incisal edge. The hook is integrally formed on either the facial surface or the lingual surface of the aligner body. The hook is configured so that an elastic band can be attached thereto. The hook is positioned between the gingival edge and the incisal edge of the aligner body. The hook and the aligner body are made at the same time by creating a physical 3D model of the patient's teeth that includes protrusions in pre-selected hook locations. A polymer is then thermoformed over the physical 3D model, thereby creating the aligner having built-in hooks.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention is an orthodontic aligner having built-in hooks for attaching elastic bands thereto. The built-in hooks are formed and positioned to be more effective, comfortable, and aesthetically pleasing than hooks formed by conventional methods.

Apparatus

Figure 1B:
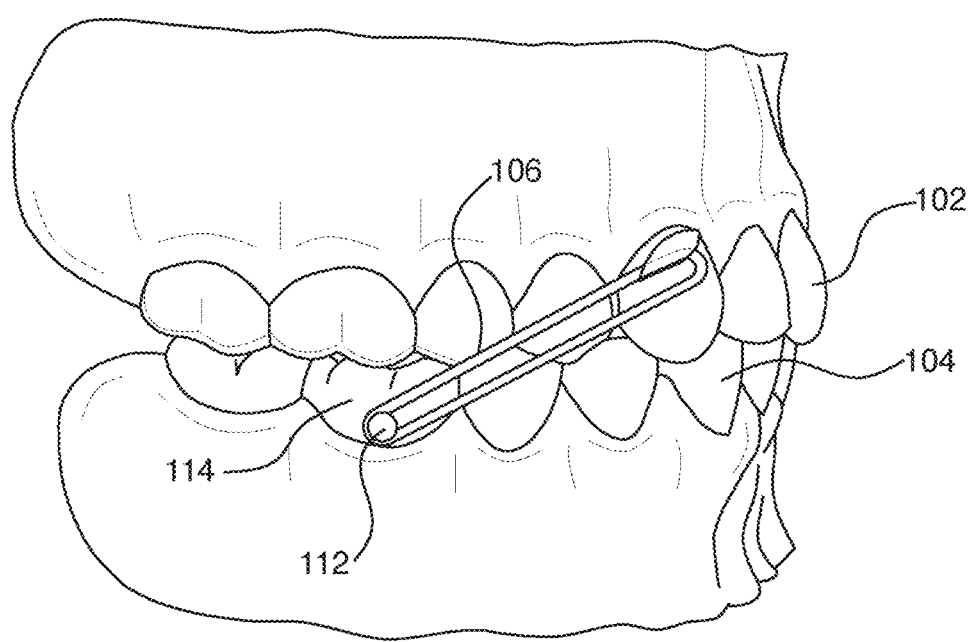

FIGS. 1A and 1B depict a set of aligners 102, 104 that are configured for being used with elastic bands 106. In this approach, the upper aligner 102 includes a precision cut hook 108 that is formed by cutting notches in the aligner 102 from the gingival (top) edge of the aligner towards the incisal or occlusal (lower) edge of the aligner 102. The lower aligner 104 includes a notch 110 cut therein for accommodating a button 112 that is attached directly to one of the patient's lower teeth 114.

One disadvantage of the approach shown in FIGS. 1A and 1B is that the precision cut hook 108 has sharp edges that may poke the inner surfaces of the patient's mouth. The location of the hook 108 being along the gingival edge of the aligner 102 may be problematic since the plastic of the aligner 102 is relatively thin along the gingival edge and the hook 108 is susceptible to breaking or bending due to the reduced thickness. Indeed, the aligner 102 is limited to one hook 108 per tooth surface due to the reduced thickness of the plastic at the hook location. The pulling force applied to the gingival edge of the aligner 102 by the elastic band 106 is mostly in the vertical direction, which may cause the aligner 102 to become dislodged and fall out of place. Another disadvantage is that it may be uncomfortable or unsightly for the patient to have a button 112 semi-permanently attached directly to a tooth. Yet another disadvantage is that the elastic band 106 may be difficult for the patient to attach to the hook 108 and the button 112 due to the close proximity of the hook 108 and the button 112 to the gingival edge of the aligners 102, 104.

Figure 2A:
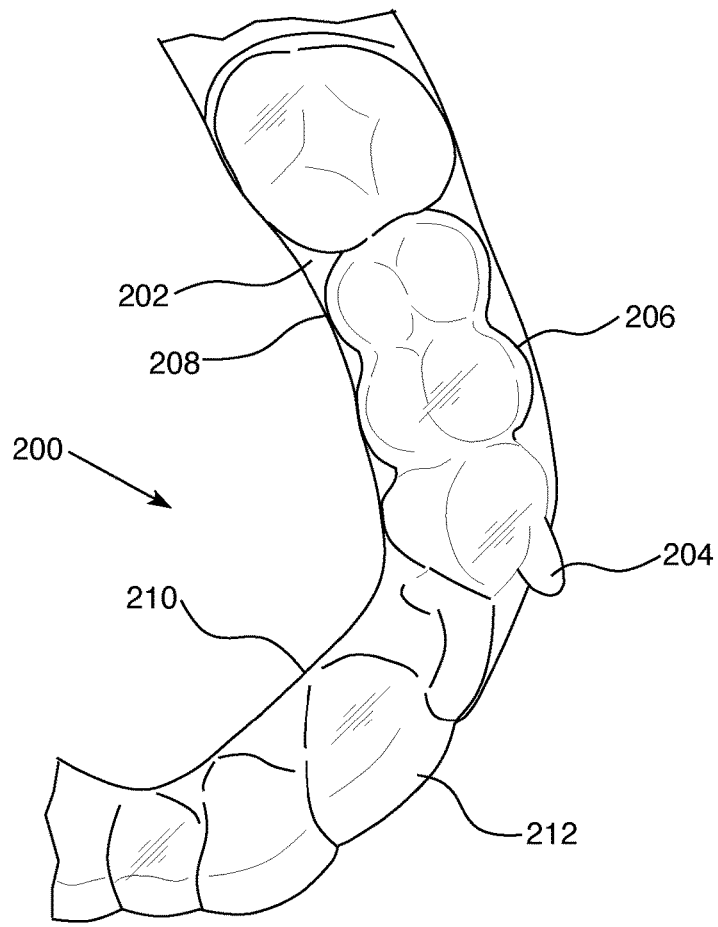
FIGS. 2A and 2B illustrate an aligner with a built-in hook in accordance with one embodiment of the present invention.
Figure 2B:
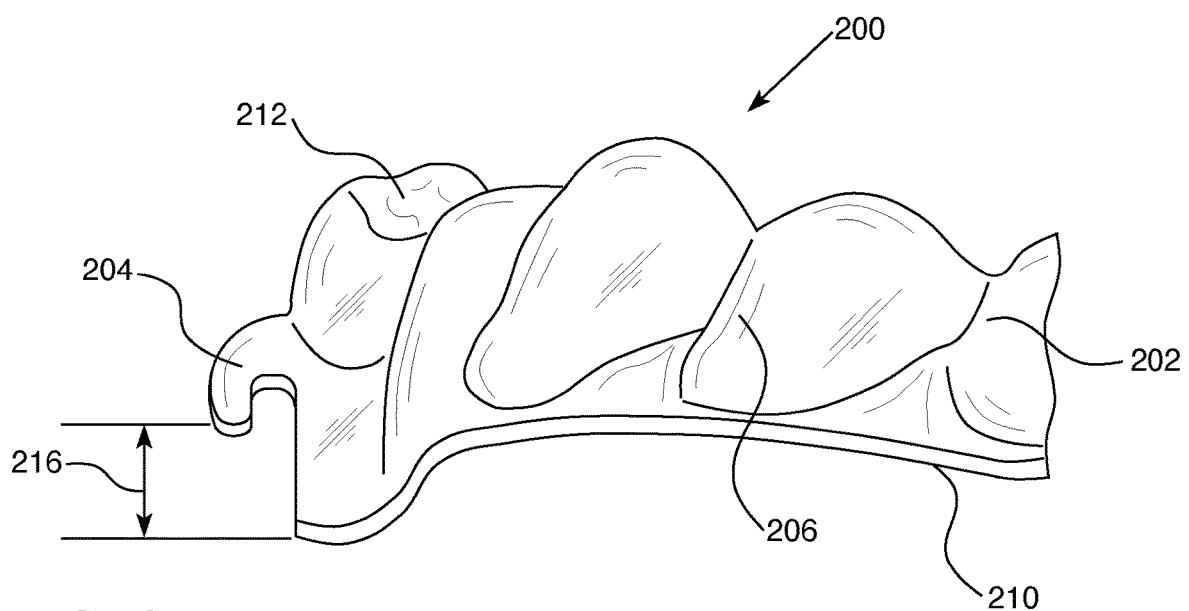

The aligners of the present invention are formed with built in hooks, rather than cutting notches in the aligner to form hooks. FIGS. 2A and 2B illustrate an aligner 200 having an aligner body 202 and a hook 204 protruding therefrom. The aligner body 202 is configured for being positioned over either the upper teeth or the lower teeth. The aligner body 202 has a facial surface 206 that faces the patient's inner lip and inner cheek. The aligner body 202 further has a lingual surface 208 that faces the patient's tongue. Still further, the aligner body 202 has a gingival edge 210 that is positioned along the patient's gum line and an incisal edge 212 that is positioned along the biting surfaces of the teeth.

Figure 3A:
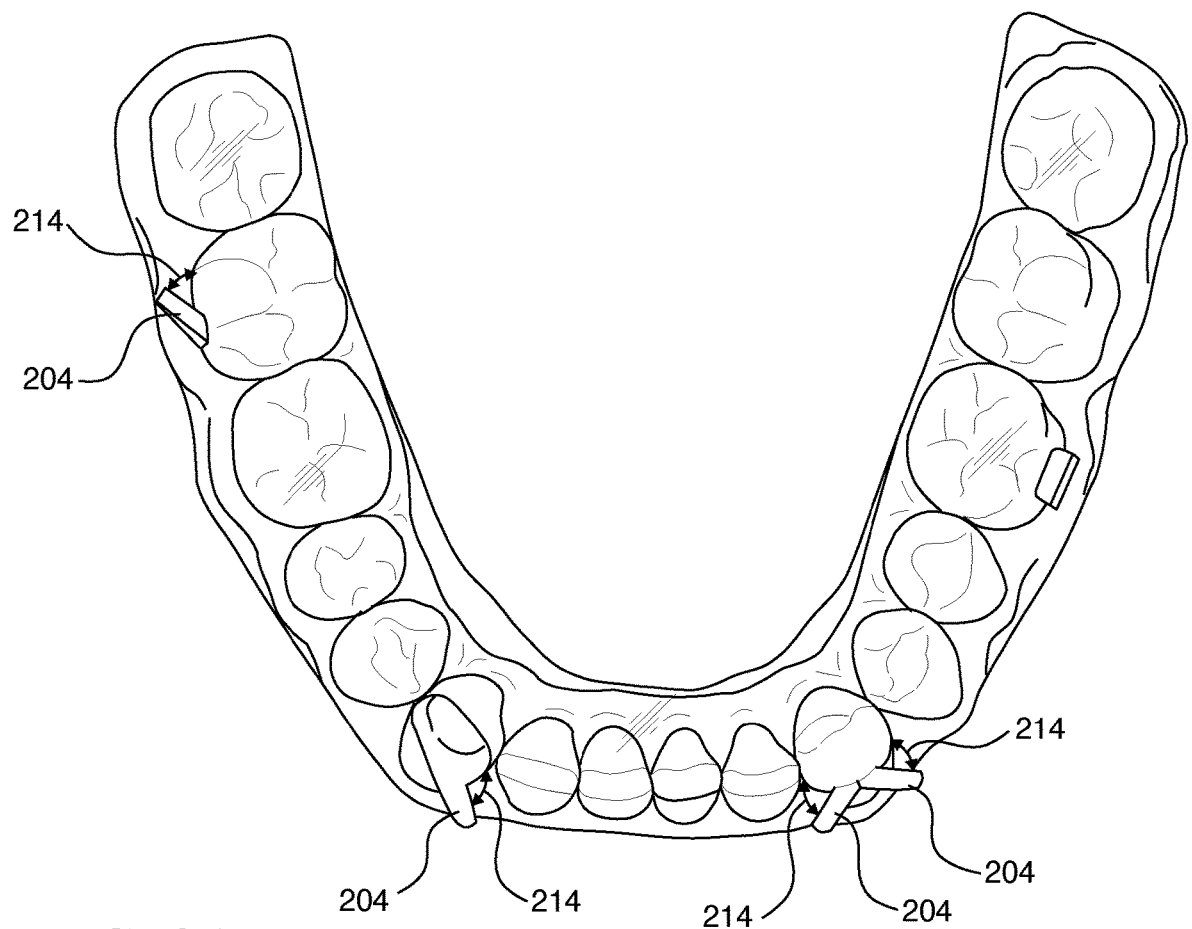
FIGS. 3A-3C illustrate models of a set of teeth to be used in manufacturing an aligner with a plurality of built-in hooks in accordance with another embodiment of the present invention.
Figure 3B:
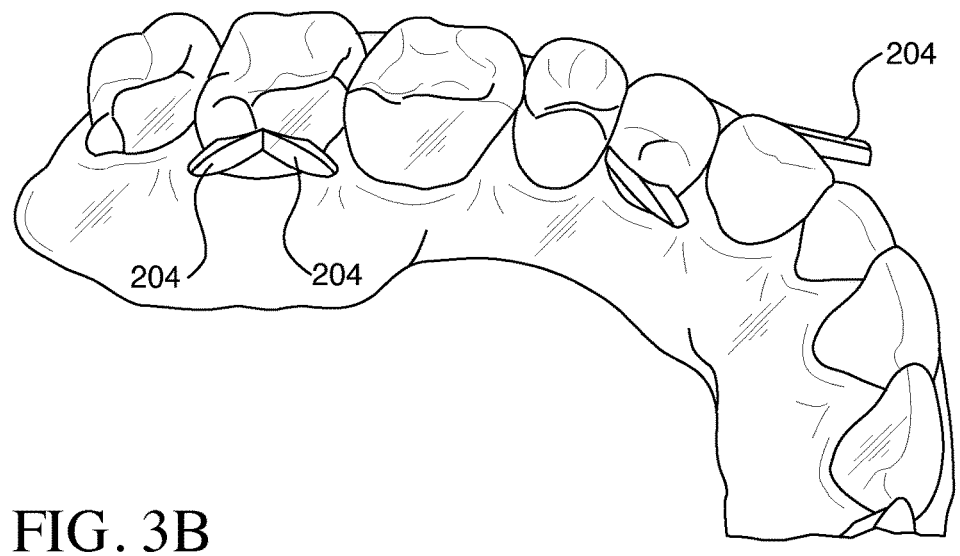

The hook 204 is integrally formed with the aligner body 202. That is, the aligner body 202 and the hook 204 are formed at the same time. In the embodiment shown in FIGS. 2A and 2B, the hook 204 is formed on the facial surface 206 of the aligner body 202. However, the hook 204 may alternatively or additionally be formed on the lingual surface 208 of the aligner body 202. For example, as shown in FIGS. 3A and 3B, multiple hooks 204 may be formed on the aligner body 202 and may be positioned on the facial surface 206, the lingual surface 208, or both. The hook 204 is angled and configured for removably attaching an elastic band thereto.

One advantage of the built-in hook 204 is that the hook 204 is positioned adjacent to the middle of the tooth rather than near the gingival edge 210 of the aligner body 202, which helps to keep the aligner 200 in place in the patient's mouth. Another advantage of the hook 204 in accordance with the present invention is that attachments applied directly to the teeth (such as the button 112 shown in FIG. 1B) are not required. The hooks 204 can be angled in such a way that they don't poke into the inner surfaces of the mouth. For example, as shown in FIGS. 3A and 3B, the hooks 204 are not perpendicular to the tooth surface. Rather, the hooks 204 are at an angle 214 relative to the tooth surface. The angle 214 is preferably less than 45 degrees. The angle may be greater than about 15 degrees to accommodate placement of the elastic bands around the hook 204. The angle of the hooks 204 may be customized depending on the tooth anatomy and orthodontic needs of the patient. For example, the hooks 204 may be angled forwards, backwards, up, or down. The hooks 204 can additionally or alternatively be angled and positioned in a more discreet location so that the hooks 204 are less noticeable. In one example, the angle 214 is between 20 and 60 degrees. Anterior hooks generally have an angle 214 that is less than that of posterior hooks so that the hooks can be as comfortable as possible for the patient while still being accessible for attaching elastics thereto. In addition, the greater the angle 214, the higher the number of elastics that can be attached to the hook 204.

The angle of the hook 204 helps to hold the aligner 200 in position in the patient's mouth. That is, the corrective force supplied by an elastic band coupled to the hook 204 has a more horizontal orientation compared to that provided by using the approach depicted in FIGS. 1A and 1B. Using the hooks 204 of the present invention makes attaching elastic bands easier compared to conventional precision cut hooks.

The hook 204 is spaced from the gingival edge 210 of the aligner body 202 by a distance 216 (see FIG. 2B). In this manner, the hook 204 is more sturdy because it is formed in a thicker portion of the aligner body 202 rather than the relatively thin portion of the aligner body 202 along the gingival edge 210. The distance 216 between the gingival edge 210 of the aligner body 202 and the hook 204 allows the bands coupled to the hook 204 to exert more horizontal force, which is advantageous for antro-posterior correction of the malocclusion. In one example, the distance 216 is at least 1 mm. This distance 216 facilitates the patient being able to attach elastic bands to the hook 204. That is, elastic bands are easier to attach to the hooks 204 of the present invention compared to the conventional precision cut hooks due to the distance 216 between the patient's gum line and the hook 204. Ideally, the distance 216 is as great as possible. For example, the hook 204 is preferably positioned as occlusal as occlusion permits.

Figure 3C:
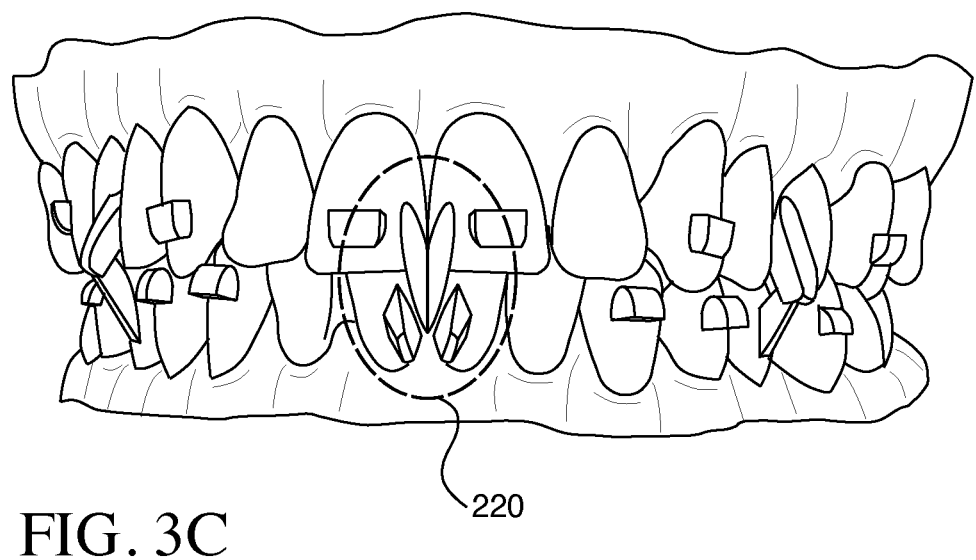

FIGS. 3A-3C depict virtual 3D models of a set of teeth having a plurality of pre-selected hook positions to add strength for heavy rubber bands usage. These virtual 3D models may be used to make the aligners 200 having hooks 204 built in at the pre-selected positions. As shown in FIGS. 3A and 3B, the hooks 204 of the present invention are formed in such a way that allows for two hooks 204 to be applied to one tooth surface. In contrast, it would not be possible to add two conventional precision cut hooks to a single tooth surface without weakening, damaging, or breaking the aligner. FIG. 3C depicts an exemplary embodiment of built in hooks 220 that align with each other. Hooks 220 on the upper teeth align with hooks 220 on the bottom teeth so that, when the upper teeth come into contact with the bottom teeth, the upper hooks 220 are positioned between the lower hooks 220. These hooks 220 may be used for holding anterior-posterior correction or crossbite correction in treatment and during retention. These hooks 220 may also be used to guide the arches together correctly in planned orthognathic surgeries.

The aligners 200 of the present invention are formed with the hooks 204. That is, the hooks 204 are formed simultaneously with the rest of the aligner 200. As such, the aligner 200 with the built in hook 204 is easier to manufacture than conventional manufacturing procedures, which require the hook to be cut into the aligner or require the hook to be added after the aligner is made. Another advantage of the aligner 200 with the built in hook 204 is that the location of the hook 204 is more accurate and more reproducible when a series of aligners is required for orthodontic treatment.

Figure 4A:
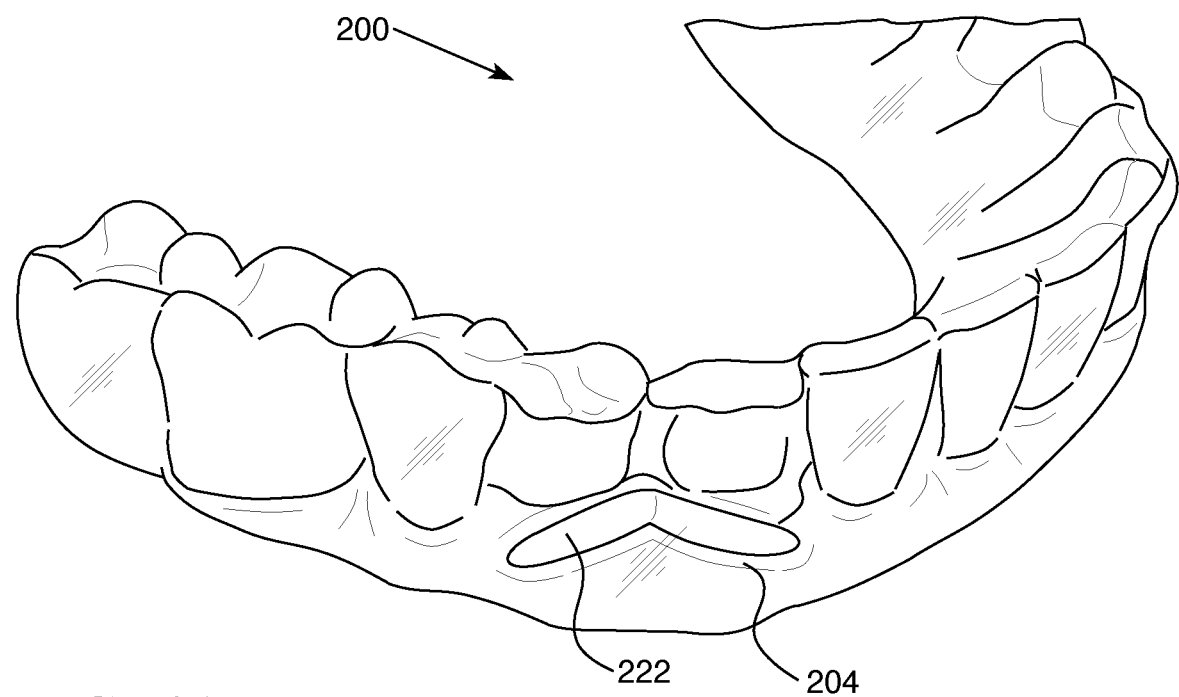
FIGS. 4A and 4B illustrate an aligner having reinforced, built in hooks in accordance with the present invention.
Figure 4B:
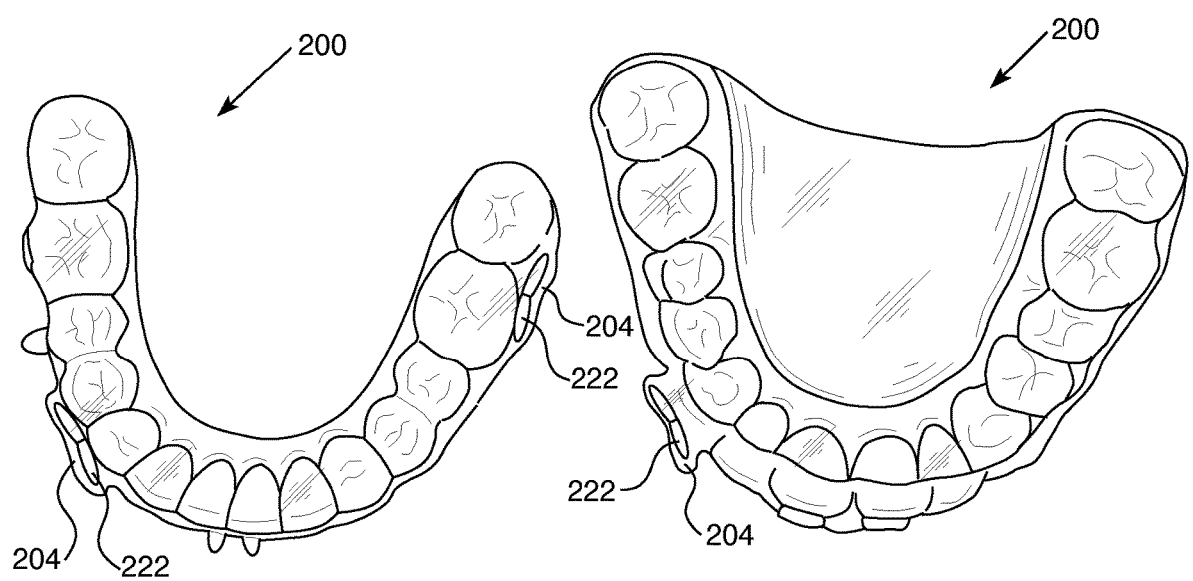

FIGS. 4A and 4B depict aligners 200 in accordance with the present invention having built in hooks 204. The hooks 204 shown in FIGS. 4A and 4B are reinforced with hard resin 222 or a similarly strong, rigid material that is made within the model fabrication. These hooks 204 having reinforcement elements 222 may be used, for example, in situations where heavy elastics or surgical wires used for orthognathic surgeries are required.

Figure 5:
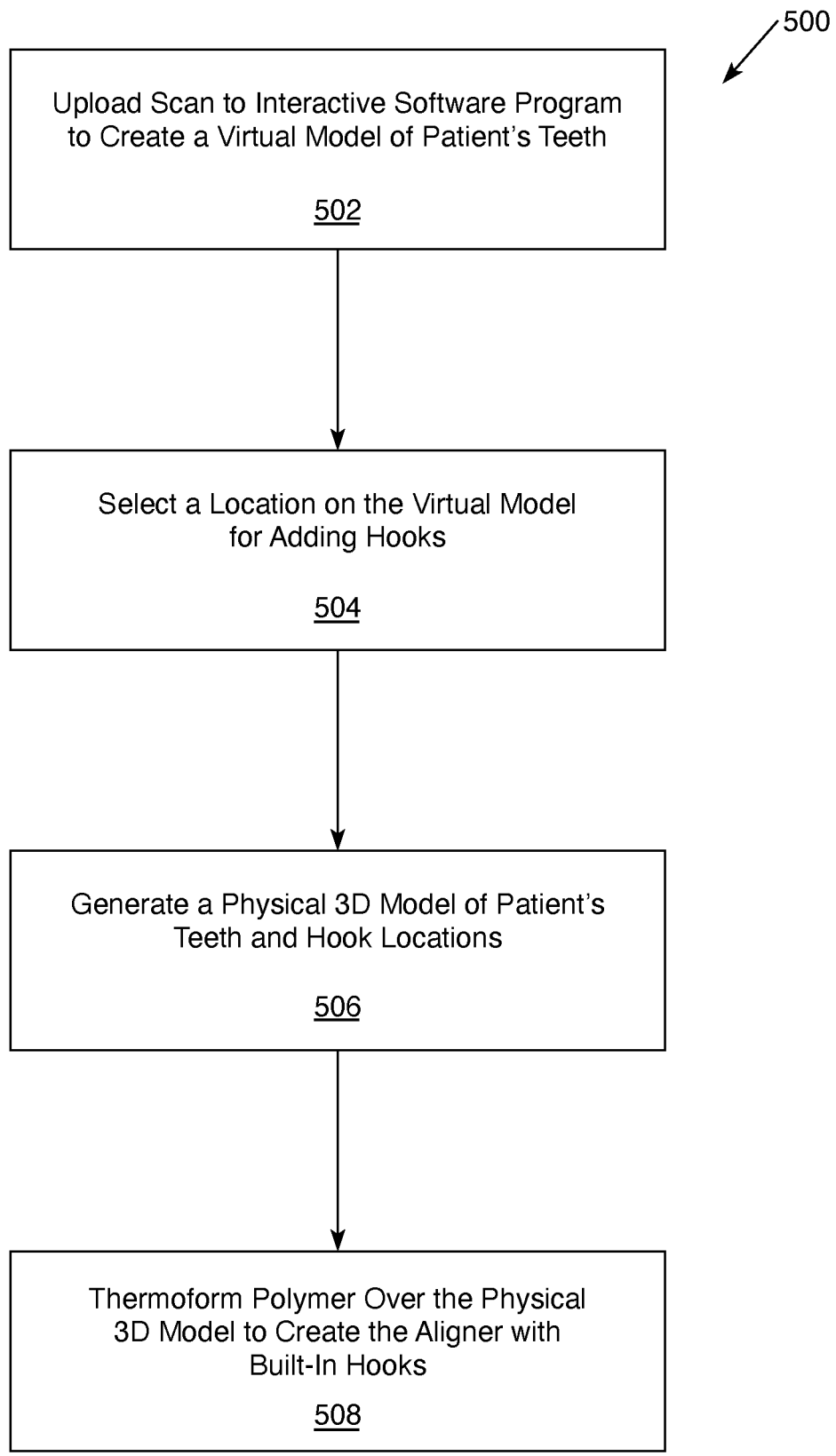
FIG. 5 is a flow chart illustrating a method for making an aligner with a built-in hook in accordance with the present invention.

One exemplary method 500 for forming the aligners 200 is depicted in FIG. 5. First, in step 502, a scan of a patient's teeth is uploaded to an interactive software program configured for generating a virtual model of the patient's teeth. Next, in step 504, the orthodontic practitioner using the interactive software selects one or more locations for adding hooks 204 to the aligner 200. The locations for the hooks 204 are selected on the virtual model of the patient's teeth. For example, FIGS. 3A-3C depict virtual models of the patient's teeth with hook locations and angles added thereto. In step 504, the practitioner is able to select a location and an angle of the desired hooks relative to the patient's teeth. The location and angle of the desired hooks is based on the orthodontic needs of the patient. Next, in step 506, a physical 3D model of the patient's teeth is generated corresponding to the virtual model. The physical 3D model includes protrusions in the pre-selected hook locations. Finally, in step 508, a polymer is thermoformed over the physical 3D model in order to form the aligner 200 having built in hooks 204.

In accordance with an embodiment of the invention, the method of making an orthodontic aligner may be embodied in software (herein also referred to as interactive software program). The software may execute on a computing device, wherein it obtains digital data comprising a scan of a patient's teeth. The software generates a virtual model of the patient's teeth. Additionally, the software receives a user input selecting a position for an aligner hook on the virtual model of the patient's teeth. A variety of input methods may be used, as would be understood by a person of ordinary skill in the art, without departing from the scope of the invention, including, but not limited to input via a keyboard, mouse, touch, etc. In one embodiment, the a virtual model and the user input selecting a position for an aligner may be sent to a production system to create a physical 3D model of the patient's teeth corresponding to the virtual model, wherein the 3D model includes a protrusion corresponding to the selected position for the aligner hook.

In one embodiment, the computing device that the software is executing on may be any computing device that would be used by a person of ordinary skill in the art, without departing from the scope of the invention, including, but not limited to a personal computer, a mobile computing device, a server (on-premise or cloud computing server), etc. In one embodiment, the software may be a stand-alone software or may be a plug-in that interacts with a virtual modeling software. The software plug-in may interface with a virtual modeling software via application programming interface (API), via a screen-scraping technique, etc. In one embodiment, the software may run on a remote or a cloud server and may interface with a virtual modeling software that is running on a local computing device via an electronic communication, such as the internet, local area network, etc.

In one embodiment, the software generates a composite model comprising the virtual model as well as protrusions based on user input. In another embodiment, the software separately sends virtual model data as well as the user input data and associated location data to the 3D model generation system.

Alternatively, the aligner 200 having built in hooks 204 may be 3D printed based directly on the virtual model of the patient's teeth. Direct printed aligners may allow more variation of the auxiliaries used and in the hook designs. As such, the step 506 of making a physical 3D model of the patient's teeth can be eliminated, thereby saving time and expense, and minimizing the number of steps and errors in the process of manufacturing the aligners 200. For example, Graphy, a specialized materials company based in Korea, has developed a process for direct 3D printing aligners. These aligners can be 3D printed with the hooks built in, in accordance with the present invention.

Forming the aligner 200 simultaneously with the hooks 204 is advantageous in that another step of adding hooks to the aligner is avoided. In conventional procedures, hooks are added to the aligner after the aligner is formed. For example, after the aligner is made, notches are cut into the gingival edge of the aligner to form precision cut hooks.

Figure 6A:
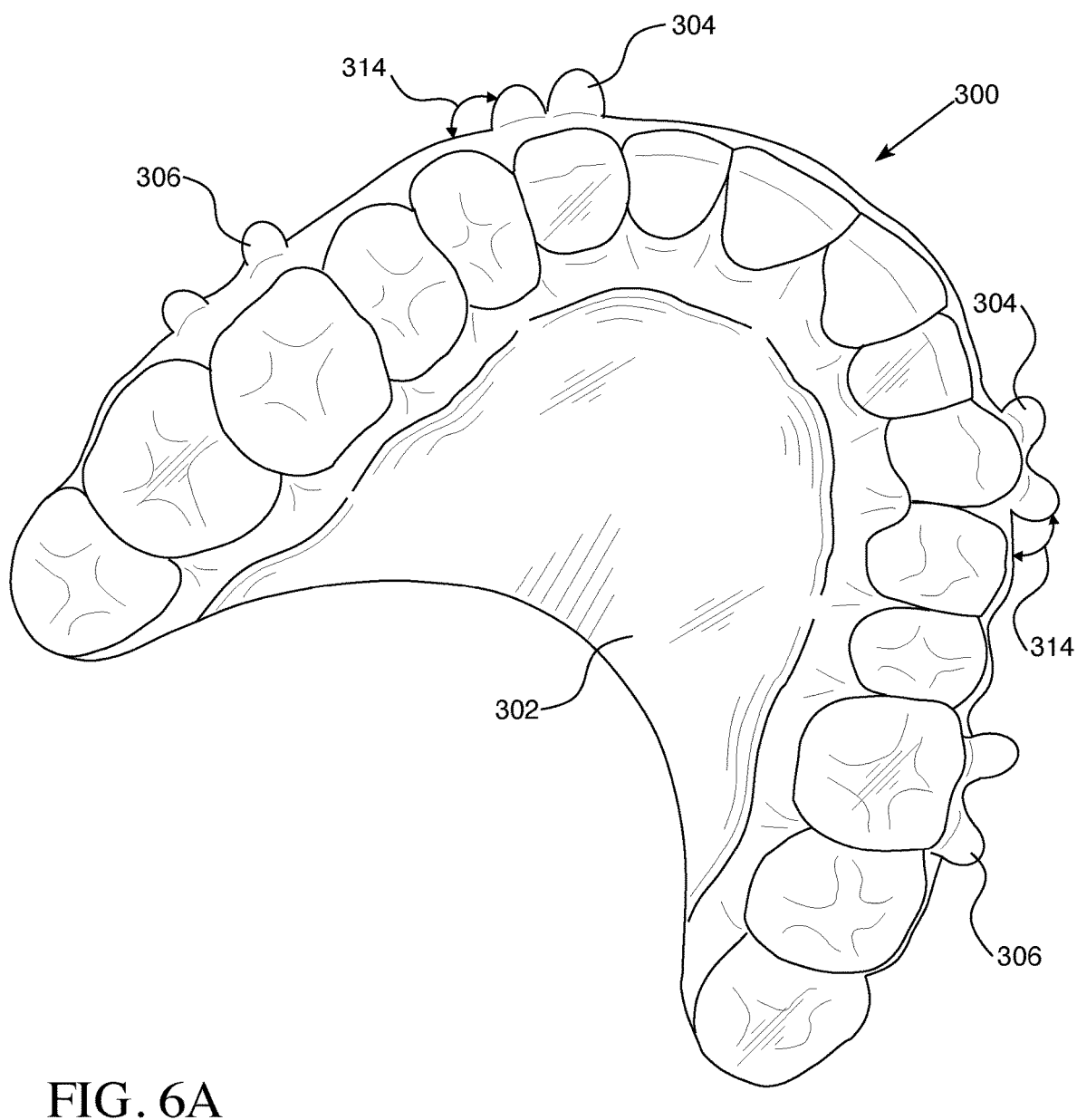
FIG. 6A is a plan view of an aligner having built in hooks configured to engage with a face mask, in accordance with one embodiment of the present invention.
Figure 6B:
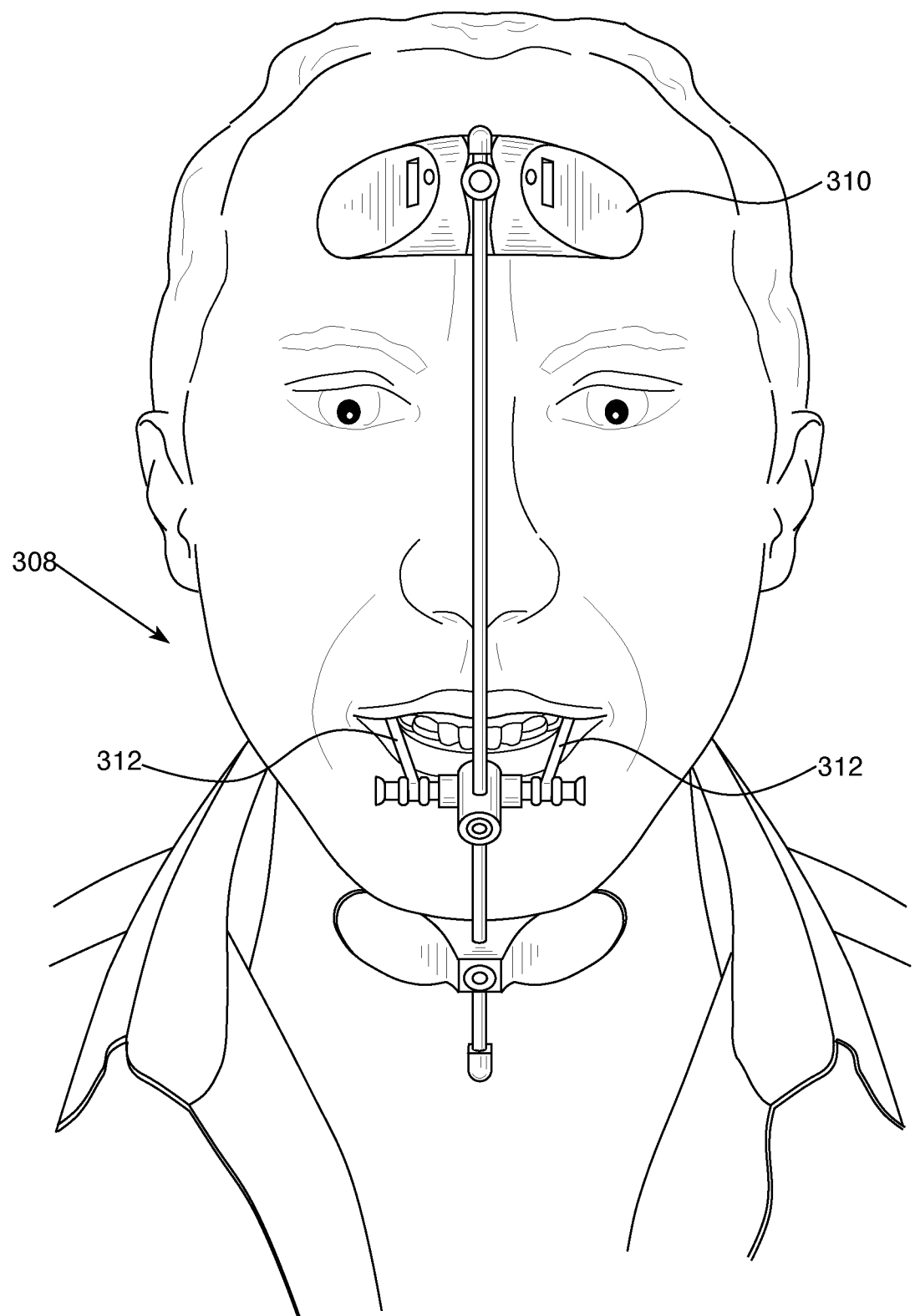
FIG. 6B illustrates a patient wearing a face mask coupled to the aligner from FIG. 6A, in accordance with one embodiment of the present invention.

One example of an aligner 300 having built in hooks 304, 306 is depicted in FIG. 6A. The aligner 300 includes hooks 304 in the canine position that may be used with a facemask. The angle 314 of the hooks 304 relative to the aligner body 302 is configured for preventing the force of the elastics from allowing the aligner 300 to be dislodged from its desired position when the aligner 300 is coupled to a face mask. FIG. 6B depicts a patient 308 wearing a face mask 310 that is attached to the aligner 300 with elastic members 312.

Figure 6C:
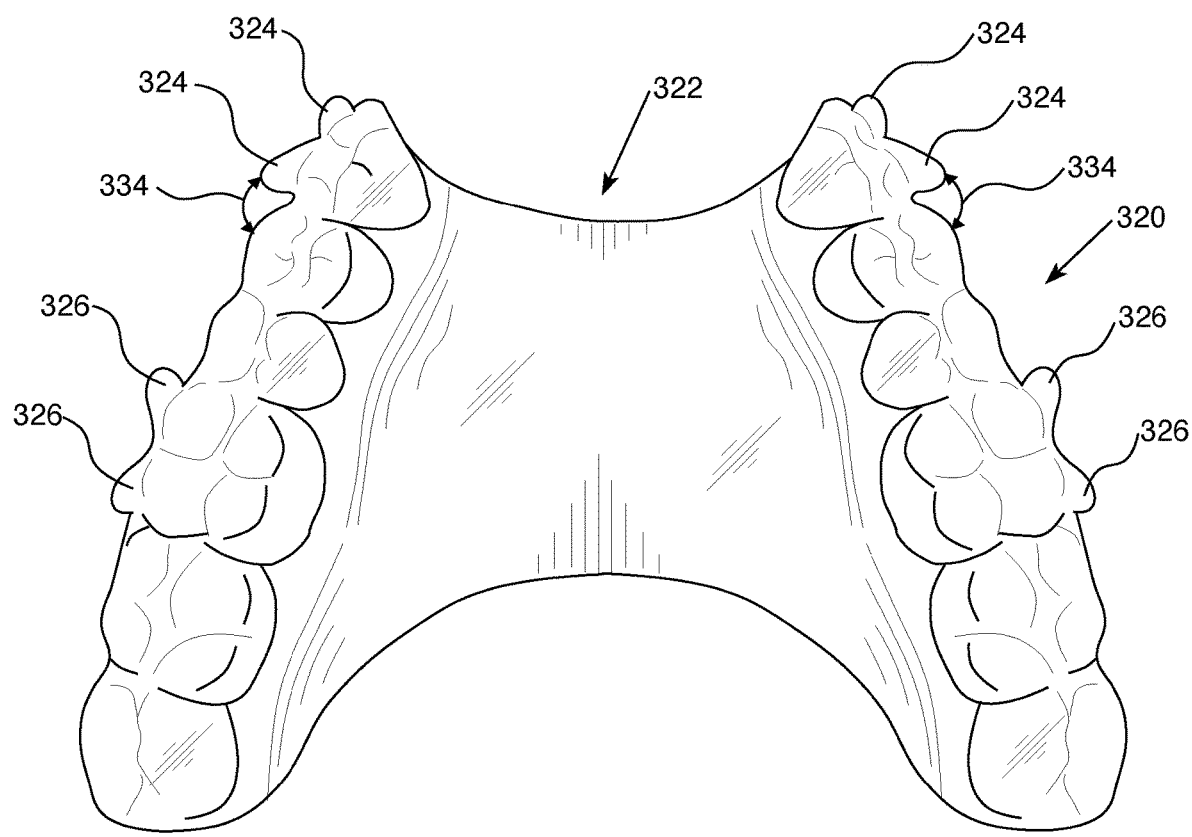
FIG. 6C is a plan view of a palate expander aligner having built in hooks configured to engage with a face mask, in accordance with one embodiment of the present invention.

In a similar example, shown in FIG. 6C, an aligner 320 is configured to be used as a palate expander and may be used in conjunction with a face mask, such as the face mask 310 shown in FIG. 6B. Similar to the previous example, the aligner 320 includes built in hooks 324, 326. The hooks 324 are located adjacent to the canine teeth and the angle 334 between the hooks 324 and the body of the aligner 320 is configured for preventing the force of the elastics 312 from allowing the aligner 320 to become dislodged from its desired position when the aligner 320 is removably coupled to the face mask 310. The aligner 320 further includes an empty space 322 for accommodating the front teeth. As such, the aligner 320 does not engage with the front teeth, but rather, is used as a palate expander. In contrast, the aligner 300 shown in FIG. 6A engages with the front teeth to facilitate alignment of the front teeth.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein.

Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method of making an orthodontic aligner, wherein the method comprises:
    uploading a scan of a patient's teeth to an interactive software program to create a virtual model of the patient's teeth;
    selecting a position for an aligner hook on the virtual model of the patient's teeth using the interactive software;
    creating a physical 3D model of the patient's teeth corresponding to the virtual model, wherein the 3D model includes a protrusion corresponding to the selected position for the aligner hook; and
    thermoforming a plastic sheet over the 3D model, thereby creating an orthodontic aligner having a built in aligner hook such that a final geometry of the aligner hook is defined by the thermoforming step and the method does not require any addition or removal of material after the thermoforming to shape the aligner hook.

2. The method of claim 1, wherein selecting the position for the aligner hook comprises selecting a location and an angle of the aligner hook relative to the patient's teeth.

3. A method of making an orthodontic aligner, wherein the method comprises:
    uploading a scan of a patient's teeth to an interactive software program to create a virtual model of the patient's teeth;
    selecting a position for an aligner hook on the virtual model of the patient's teeth using the interactive software; and
    3D printing the orthodontic aligner based on the virtual model, wherein the 3D printed orthodontic aligner comprises a built in aligner hook in the selected position such that a final geometry of the aligner hook is defined by the 3D printing step and the method does not require any addition or removal of material after the 3D printing to shape the aligner hook.

4. The method of claim 3, wherein selecting the position for the aligner hook comprises selecting a location and an angle of the aligner hook relative to the patient's teeth.

* * * * *